United States Patent
Psiuk et al.

(10) Patent No.: US 11,237,264 B2
(45) Date of Patent: Feb. 1, 2022

(54) METHOD AND DEVICE FOR LOCATING AN RFID TRANSPONDER AND RFID SYSTEM

(71) Applicant: Fraunhofer-Gesellschaft e.V., Munich (DE)

(72) Inventors: Rafael Psiuk, Nuremberg (DE); Tobias Draeger, Nuremberg (DE); Joern Thielecke, Erlangen (DE); Alfred Mueller, Nuremberg (DE); Maximilian Singh, Nuremberg (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/964,611

(22) PCT Filed: Jan. 10, 2019

(86) PCT No.: PCT/EP2019/050499
§ 371 (c)(1),
(2) Date: Jul. 24, 2020

(87) PCT Pub. No.: WO2019/145155
PCT Pub. Date: Aug. 1, 2019

(65) Prior Publication Data
US 2021/0055408 A1    Feb. 25, 2021

(30) Foreign Application Priority Data

Jan. 26, 2018 (DE) .......................... 102018101753.7
Jun. 1, 2018 (DE) .......................... 102018113120.8

(51) Int. Cl.
*G01S 13/87*    (2006.01)
*G06K 7/10*    (2006.01)

(52) U.S. Cl.
CPC ........ *G01S 13/878* (2013.01); *G06K 7/10128* (2013.01); *G06K 7/10356* (2013.01)

(58) Field of Classification Search
CPC .............. G01S 13/878; G06K 7/10128; G06K 7/10356
See application file for complete search history.

(56) References Cited

U.S. PATENT DOCUMENTS

| 6,353,406 | B1 * | 3/2002 | Lanzl ....................... G07C 9/28 342/118 |
| 2004/0169587 | A1 * | 9/2004 | Washington ....... G08B 13/2462 340/573.1 |

(Continued)

FOREIGN PATENT DOCUMENTS

| WO | 2006067851 A1 | 6/2006 | |
| WO | WO-2006067851 A1 * | 6/2006 | ........... G01S 13/878 |
| WO | 2013017596 A1 | 2/2013 | |

*Primary Examiner* — Mohamed Barakat
(74) *Attorney, Agent, or Firm* — 2SPL Patent Attorneys PartG mbB; Yong Beom Hwang

(57) ABSTRACT

A method for locating an RFID transponder is proposed. The method comprises generating a plurality of measurement signals based on a magnetic field measured by a plurality of sensors. The method further comprises determining a respective degree of correlation for each of the plurality of measurement signals with a reference signal. The reference signal is based on a data sequence assigned to the RFID transponder. In addition, the method comprises determining a position of the RFID transponder based on the degrees of correlation of the plurality of measurement signals.

25 Claims, 3 Drawing Sheets

(56) References Cited

U.S. PATENT DOCUMENTS

| | | | |
|---|---|---|---|
| 2004/0179510 A1* | 9/2004 | Kuffner | G06K 7/10039 370/350 |
| 2006/0022815 A1* | 2/2006 | Fischer | G06K 7/10356 340/505 |
| 2009/0212921 A1 | 8/2009 | Wild et al. | |
| 2010/0039228 A1* | 2/2010 | Sadr | G06K 7/10366 340/10.1 |
| 2013/0201003 A1* | 8/2013 | Sabesan | G06K 19/0723 340/10.1 |
| 2016/0283756 A1* | 9/2016 | Lenchner | G01S 5/04 |

\* cited by examiner

METHOD AND DEVICE FOR LOCATING AN RFID TRANSPONDER AND RFID SYSTEM

TECHNICAL FIELD

The present disclosure addresses the localization of RFID transponders. In particular, embodiments relate to a method and device for locating an RFID transponder. Further embodiments also relate to an RFID system.

BACKGROUND

RFID (Radio Frequency IDentification) systems are used for a wide range of applications. They are used in logistics, production and access systems. There are three families of technology, each of which differs in its coupling mechanisms between reader and transponder as well as the underlying frequency. The properties of the three technologies are different, but the goal is the same: The wireless identification of objects to which a transponder is attached.

The three technologies are LF (Low Frequency) technology at an operating frequency of about 125 kHz, HF (High Frequency) technology at an operating frequency of about 13.56 MHz and UHF (Ultra High Frequency) technology at operating frequencies around 868 MHz and 925 MHz, respectively. All systems use different types of modulation, encoding and communication protocols.

All transponders are designed to enable identification. However, they are not optimized in terms of localization functionality. If several transponders are now simultaneously present in the exciter field of a reader, their secondary and/or response fields overlap. Without bidirectional communication between transponder and reader using a complex anti-collision protocol, it is not possible to clearly assign the field strengths measured in the reader to the individual transponders.

There is thus a need to provide an improved possibility for localization of RFID transponders.

SUMMARY

This need may be met by the subject matter of the patent claims.

One embodiment relates to a method for locating an RFID transponder. The method comprises generating a plurality of measurement signals based on a magnetic field measured by a plurality of sensors. The method further comprises determining a respective degree of correlation for each of the plurality of measurement signals with a reference signal. The reference signal is based on a data sequence assigned to the RFID transponder. In addition, the method comprises determining a position of the RFID transponder based on the degrees of correlation of the plurality of measurement signals.

A further embodiment relates to a device for locating an RFID transponder. The device comprises a plurality of sensors configured to generate a plurality of measurement signals based on a magnetic field measured by the plurality of sensors. The device further comprises a processing circuit configured to determine a respective degree of correlation for each of the plurality of measurement signals with a reference signal. The reference signal is based on a data sequence assigned to the RFID transponder. The processing circuit is further configured to determine a position of the RFID transponder based on the degrees of correlation of the plurality of measurement signals.

In addition, one embodiment relates to an RFID system comprising a device for locating an RFID transponder in accordance with one of the embodiments and an RFID transponder. The RFID transponder is configured to generate a first field component of the magnetic field, wherein the first field component carries first data which is based on the data sequence assigned to the RFID transponder. Furthermore, the RFID system comprises a further RFID transponder, wherein the further RFID transponder is configured to generate a second field component of the magnetic field. The second field component carries second data which is based on a further data sequence assigned to the further RFID transponder, the first data being orthogonal to the second data.

BRIEF DESCRIPTION OF THE FIGURES

Some examples of devices and/or methods will be described in the following by way of example only and with reference to the accompanying figures, in which.

DESCRIPTION

Various examples will now be described more fully with reference to the accompanying figures in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 elements.

The terminology used herein for the purpose of describing particular examples is not intended to be limiting for further examples. Whenever a singular form such as "a," "an," and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including," when used, specify the presence of the stated features, integers, steps, operations, processes, elements, components and/or any group of the same, but do not preclude the presence or addition of one or more other features, integers, steps, operations, processes, elements, components and/or any group thereof.

Unless otherwise defined, all terms (including technical and scientific terms) are used herein in their ordinary meaning of the art to which the examples belong.

Figure 1:
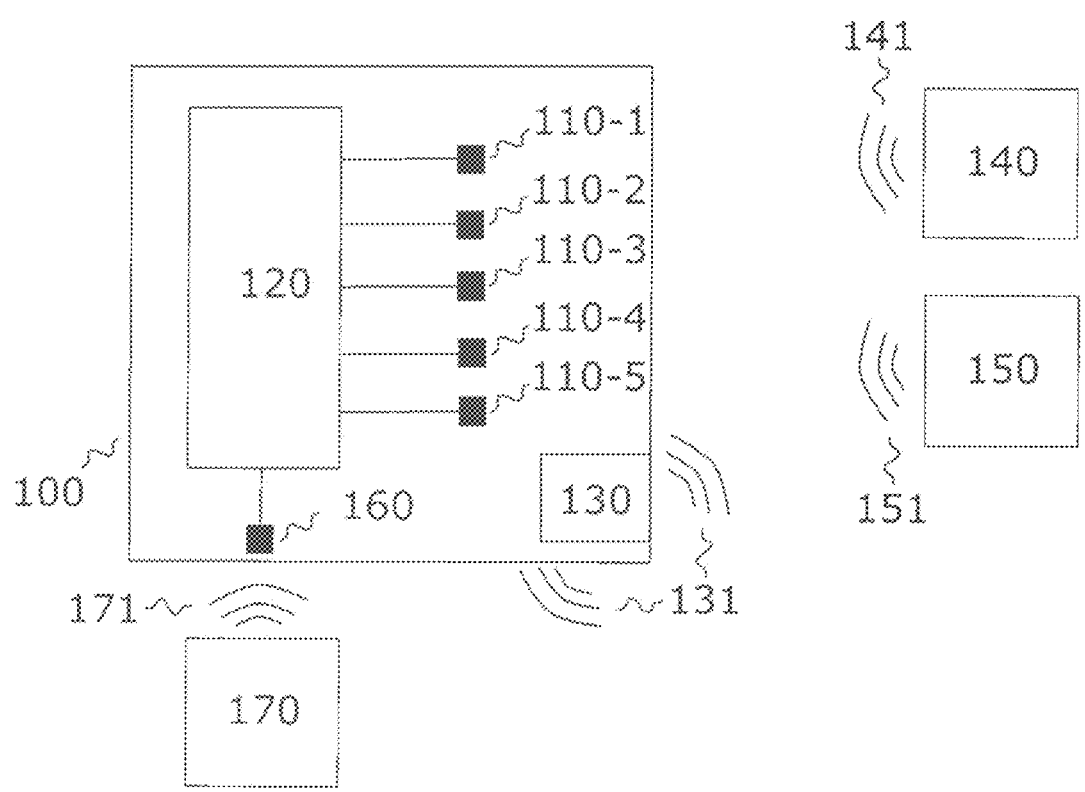
FIG. 1 illustrates an embodiment of an RFID system.

FIG. 1 illustrates a device 100 for locating an RFID transponder 140. Device 100 comprises a plurality of sensors 110-1, 110-2, 110-3, 110-4 and 110-5. Although five sensors are illustrated in FIG. 1, device 100 may have any number of sensors. The plurality of sensors 110-1, 110-2, 110-3, 110-4 and 110-5 are configured to generate a plurality of measurement signals based on a magnetic field measured by the plurality of sensors. Each of the sensors is thus configured to generate a respective measurement signal based on the magnetic field measured at its respective position. The plurality of sensors 110-1, 110-2, 110-3, 110-4 and 110-5 may basically comprise any type of sensor suitable for measuring the strength of the magnetic field. For example, the plurality of sensors 110-1, 110-2, 110-3, 110-4 and 110-5 may be configured as a conductor loop, coil (with one or more windings), antenna or magnetometer (e.g. Hall sensor).

The magnetic field is determined by the magnetic fields of the RFID transponders located near and/or in the vicinity of device 100. In FIG. 1 the RFID transponder 140 and the further RFID transponder 150 are shown merely exemplarily. It will be understood that fewer or even more RFID transponders may be present in the vicinity of the device. In the example shown in FIG. 1, the magnetic field correspondingly comprises a first field component 141 generated by the RFID transponder 140 and a second field component 151 generated by the further RFID transponder 150. In other words: The magnetic field measured by the plurality of sensors 110-1, 110-2, 110-3, 110-4 and 110-5 is a superposition of the (pronounced) magnetic fields generated by the RFID transponders located near and/or in the vicinity of device 100.

The RFID transponder 140 uses a data sequence assigned to it to form and/or modulate its secondary field. The data stored in RFID transponders is in some embodiments encoded by them before transmission (e.g. by means of Manchester or biphase encoding). The first field component 141 generated by RFID transponder 140 may thus be generated using an encoded data sequence which is based on the data sequence assigned to RFID transponder 140. Accordingly, the second field component 151 of the further RFID transponder 150 may also be generated using a further encoded data sequence which is based on a further data sequence assigned to the further RFID transponder 150. The encoded data sequence of the RFID transponder 140 is orthogonal to the further encoded data sequence of the further RFID transponder 150. The data sequence assigned to RFID transponder 140 may itself be orthogonal to the data sequence assigned to the further RFID transponder 150. Alternatively, the RFID transponders may forgo the encoding. Accordingly, the field components are then based directly on the orthogonal data sequences of the RFID transponders. In other words: The first field component 141 generated by the RFID transponder 140 carries first data which is based on the data sequence assigned to the RFID transponder 140. The second field component 151 generated by the further RFID transponder 150 carries second data which is based on a further data sequence assigned to the further RFID transponder 150, the first data being orthogonal to the second data.

The transponders 140 and 150 may be configured, for example, to generate their field components 141 and 151, respectively, with a frequency of less than 500 kHz (LF transponder) or a frequency between 1 MHz and 100 MHz (HF transponder).

The RFID transponders 140 and 150 thus use respective assigned data sequences, which, for example, have orthogonality to each other after the transponder-specific encoding. In other words: Each of the RFID transponders 140 and 150 modulates a respective field component of the magnetic field with orthogonal data. For example, the data sequence assigned to the RFID transponder 140 (or the further RFID transponder 150 or other RFID transponders) may be a Hadamard sequence, a Walsh sequence, a Gold sequence, or a sequence of maximum length (also known as M sequence). However, the data sequence assigned to the RFID transponder 140 (or the further RFID transponder 150 or other RFID transponders) is not limited to the aforementioned sequences. Rather, any sequence may be used that is (still) sufficiently orthogonal to correspondingly encoded sequences of further RFID transponders before and/or after encoding by an RFID transponder.

The orthogonality of the information contained in the individual field components of the respective RFID transponders may now be used to determine the portions of the individual RFID transponders 140, 150 of the magnetic field measured by the plurality of sensors 110-1, 110-2, 110-3, 110-4 and 110-5.

For this purpose, the device 100 further comprises a processing circuit 120 which is coupled to the plurality of sensors 110-1, 110-2, 110-3, 110-4 and 110-5 and configured to receive the plurality of measurement signals. The evaluation circuit 120 is further configured to correlate a reference signal with each of the plurality of measurement signals (e.g. by means of cross-correlation) and to determine a respective degree of correlation for each of the plurality of measurement signals with the reference signal. The reference signal is based on the data sequence assigned to the RFID transponder 140. By correlating the reference signal with the plurality of measurement signals, the signal portion originating from the RFID transponder 140 of the respective one of the plurality of measurement signals may be determined. Due to the orthogonality of the data modulated onto the individual field components 141, 151, the second field component 151 has no influence on the correlation of one of the measurement signals with the reference signal, which is based on the data sequence assigned to the RFID transponder 140. Accordingly, the respective degree of correlation for each of the plurality of measurement signals with the reference signal may be construed as a measure of the strength of the field portion originating from the RFID transponder 140 at the position of the respective sensor.

Based on this, the position of the RFID transponder 140 may now be determined. In other words: The processing circuit 120 is further configured to determine the position of the RFID transponder 140 based on the degrees of correlation of the plurality of measurement signals.

For example, the processing circuit 120 may be configured to determine the position of the RFID transponder 140 by comparing the degrees of correlation of the plurality of measurement signals to sets of reference degrees of correlation. A possible (one-dimensional, two-dimensional or three-dimensional) position of the RFID transponder is each assigned to the sets of reference degrees of correlation. While the degrees of correlation of the plurality of measurement signals may be considered as measures of the actual strength of the field component originating from the RFID transponder 140 at the position of the plurality of sensors 110-1, 110-2, 110-3, 110-4 and 110-5, the sets of reference degrees of correlation may be understood as expected values for the degrees of correlation of the plurality of measurement signals when positioning the RFID transponder 140 at known positions. Thus the actual course of the field strength of the part of the magnetic field measured originating from the RFID transponder 140 is effectively compared via the sensor positions to known reference courses for possible positions of the RFID transponder 140.

The reference degrees of correlation may, for example, each be determined by a simulation. Alternatively, the reference degrees of correlation may each be determined by measurements. In addition to the position, also a possible orientation of the RFID transponder 140 may each be assigned to the sets of reference degrees of correlation.

For the further RFID transponder 150, the processing circuit 120 may accordingly be configured to determine a respective further degree of correlation for each of the plurality of measurement signals with a further reference signal. The further reference signal is based on the data sequence assigned to the further RFID transponder 150. Due to the orthogonality of the data sequences both before and after the encoding by the RFID transponders, the strength of the field portion originating from the further RFID transponder 150 may thus be determined at the position of the respective sensor. Accordingly, the processing circuit 120 may further be configured to determine a position of the further RFID transponder 150 based on the further degrees of correlation of the plurality of measurement signals. The determination of the degrees of correlation as well as the further degrees of correlation and the determination of the positions of the RFID transponder 140 as well as the further RFID transponder 150 may take place simultaneously (parallel).

The device 100 may thus enable the one-dimensional, two-dimensional or three-dimensional localization of e.g. ordinary LF and HF RFID transponders (only the data sequences described above each have to be written into a memory of the respective RFID transponder). If an RFID transponder with its known data sequence is located in the exciter field of a reader, the height of the correlation peak (i.e. the degree of correlation) in the RFID reader may be regarded as an indicator for the measured field strength of the respective antenna. By offsetting the correlation peaks (i.e. the degrees of correlation), the RFID transponder may be located (after calibration) according to the aforementioned principles. Due to the property of orthogonality of the individual data sequences both before and after encoding, one data sequence has no contribution to the correlation peak (i.e. the degree of correlation) of the other sequences orthogonal to it—and vice versa. In this way, the field contributions of the individual RFID transponders used for localization may be separated in the receiver. The influence of the individual transponder responses is prevented by the orthogonality of the data modulated onto the field components, so that a simultaneous localization of several RFID transponders is possible. In such a way a complex bidirectional communication between the RFID transponders and a reader may be omitted, so that communication standards with their strict timing and/or time constraints do not have to be observed.

Optionally, the orientation of the RFID transponder may also be determined. Device 100 may also be used with the usual standard protocols for integrated circuits for RFID transponders.

In order to ensure the orthogonality of the data modulated onto the field components, it may be necessary for the transponders to substantially synchronously form their secondary fields. This may be done by controlling the magnetic exciter field 131 provided by the device 100 for the RFID transponders.

Device 100 comprises one or more exciter elements 130 to form the magnetic exciter field 131. All exciter elements which form the magnetic exciter field 131 are configured to first interrupt the formation of the magnetic exciter field 131 (e.g. for a predetermined duration) and subsequently to resume the formation of the magnetic exciter field 131 in order to supply RFID transponders receiving the magnetic exciter field 131 with energy substantially simultaneously via the magnetic exciter field 131.

This approach may be used for RFID transponders that are operated in a so-called Transponder-Talks-First (TTF) mode to force a simultaneous modulation of the magnetic field by the RFID transponders. In TTF mode, a transponder begins to modulate its antenna depending on the data stored on the RFID transponder as soon as it is exposed to a sufficiently strong magnetic exciter field. By interrupting the formation of the magnetic exciter field 131, all RFID transponders in TTF mode may now first be deactivated, and then be supplied with energy substantially simultaneously by the renewed formation of the magnetic exciter field 131 and thus be activated again. Assuming that the RFID transponders 140 and 150 shown in FIG. 1 operate in TTF mode, they may be controlled according to the scheme described above for generating the magnetic exciter field 131 to modulate their two field components 141 and 151 substantially simultaneously. Independent of which specific data sequence the two RFID transponders 140 and 150 use, the synchronicity and thus the orthogonality of the information modulated onto the two field components 141 and 151 may be ensured. For example, the RFID transponder 140 may be configured to generate the first field component 141 in response to receiving the magnetic exciter field 131.

Alternatively, the magnetic exciter field 131 may also comprise a command to trigger the transponder responses. The at least one exciter element 130 may alternatively or additionally be configured to modulate a command onto the magnetic exciter field 131, which instructs all RFID transponders receiving the command to form a magnetic field based on data stored in the RFID transponder. Even if the RFID transponders 140 and 150 shown in FIG. 1 do not support the TTF mode, they may be controlled according to the scheme described above for generating the magnetic exciter field 131 to modulate their two field components 141 and 151 substantially simultaneously. For example, the RFID transponder 140 may be configured to generate the first field component 141 in response to receiving the command modulated onto the magnetic exciter field 131. The command may be a standard command for RFID readers, for example.

The at least one exciter element 130 may for example be configured as a conductor loop, coil (with one or more windings) or antenna. The at least one exciter element 130 and the plurality of sensors 110-1, 110-2, 110-3, 110-4 and 110-5 may be configured as separate components or as a single component. That is, in some embodiments a single component (e.g. a coil) may serve both as a sensor and as an exciter element if appropriately controlled.

For example, if gold sequences or Hadamard sequences are used that satisfy the Yuen theorem, they do not have to be synchronous in time. Hadamard sequences that satisfy the Yuen theorem are always completely (ideally) orthogonal.

As already described above, the synchronicity and thus the orthogonality of the information (data sequences) modulated onto the two field components 141 and 151 may be ensured by cyclically switching the magnetic exciter field 131 on and off, for example. The RFID transponders located in the propagation range of the magnetic exciter field 131 may thereby be reset so that the RFID transponders modulate their respective field component substantially simultaneously.

The data sequences used may be orthogonal to each other so that they are distinguishable from each other by device 100. However, the autocorrelation functions of the individual data sequences may have several correlation peaks. Each of the data sequences generates peaks at different locations. Likewise, the individual data sequences may have a different number and different distribution of (cross-) correlation peaks.

If the RFID transponder 140 would not be located in the propagation range of the magnetic exciter field 131 and the plurality of measurement signals (representing the field component of the further RFID transponder 150 and optionally further RFID transponders in the propagation range of the magnetic exciter field 131) would be correlated with the reference signal which is based on the data sequence assigned to the RFID transponder 140, a variety of correlation peaks could result. These could erroneously be seen as autocorrelation peaks and be used for further localization, which would lead to an unintentional localization of the RFID transponder 140 which is not in the propagation range of the magnetic exciter field 131.

In the following, an approach is therefore described to select the time instant from the temporal correlation result across all sensors (e.g. antennas) and the reference signals and/or data sequences, at which the correlation peaks of the respective synchronous (and thus orthogonal) data sequences are located. Namely, at this time instant there is an actual autocorrelation peak to which all data sequences are orthogonal to each other and thus the field components of the individual RFID transponders are completely separable. Hence a reliable and individual localization of individual RFID transponders on the basis of the measurement signals may be enabled.

For this purpose, the device 100 comprises a reference sensor 160, which is configured to generate a reference measurement signal based on a measurement of the magnetic field. The reference sensor 160 may be configured similar to the plurality of sensors 110-1, 110-2, 110-3, 110-4 and 110-5. Alternatively, the reference sensor 160 may be configured different from the plurality of sensors 110-1, 110-2, 110-3, 110-4 and 110-5. For example, the reference sensor 160 may be configured as differential antenna.

In addition to the field components 141, 151 of the RFID transponder 140 and the further RFID transponder 150, the magnetic field comprises a field component 171 generated by a reference RFID transponder 170. A data sequence is also assigned to the reference RFID transponder 170. For example, the data sequence may be chosen such that it has few clearly defined autocorrelation peaks and few, weakly pronounced side peaks. In other words: The data sequence may be chosen such that the reference RFID transponder 170 has (very) good autocorrelation properties.

The reference RFID transponder 170 may, for example, be located somewhat detached to the (expected and/or possible) positions of the RFID transponder 140 and the further RFID transponder 150. Likewise, the reference sensor 160 may be located somewhat detached to the (expected and/or possible) positions of the RFID transponder 140 and the further RFID transponder 150. In this way it may be ensured that the reference sensor 160 predominantly measures only the field component 171 modulated by the reference RFID transponder 170. For example, the reference sensor 160 and the reference RFID transponder 170 may be arranged spaced apart from the plurality of sensors 110-1, 110-2, 110-3, 110-4 and 110-5 such that a signal strength of a signal component which is based on the field component 171 of the magnetic field generated by the reference RFID transponder 170, is greater in the reference measurement signal than a summed signal strength of signal components which are based on field components of the magnetic field (e.g. field components 141 and 151) generated by other RFID transponders (e.g., RFID transponders 140 and 150). Under this condition a distance $r_2$ of the RFID transponders to be located from the reference sensor 160 may be determined, e.g. according to the following expression (1):

$$r_2 > r_1 * \sqrt[3]{\sqrt{X}} \tag{1},$$

where $r_1$ is the distance of the reference RFID transponder 170 from the reference sensor 160 and X is the number of RFID transponders to be located.

The magnetic exciter field 131 is excited by the same current both in the range of the RFID transponders 140 and 150 to be located and in the range of the reference RFID transponder 170. For example, the RFID transponders 140 and 150 to be located as well as the reference RFID transponder 170 may be arranged within a conductor loop that generates the magnetic exciter field 131. Thus, all RFID transponders see the magnetic exciter field 131 at the same time and therefore start their field modulation substantially at the same time.

The processing circuit 120 is now further configured to determine a time instant $S_0$ of a maximum correlation of the reference measurement signal with a calibration signal. Similar to the reference signals described above, the calibration signal is based on the data sequence assigned to the reference RFID transponder 170.

The time instant $S_0$ of maximum correlation of the reference measurement signal with the calibration signal (i.e. the time instant of occurrence of the autocorrelation peak for the data sequence assigned to the reference RFID transponder 170) represents that time instant at which the reference RFID transponder 170 begins to modulate its field component 171. Since all RFID transponders are supplied with energy substantially simultaneously by the magnetic exciter field 131, it may be assumed that their autocorrelation peaks also substantially occur at the time instant $S_0$.

When determining the respective degree of correlation for each of the plurality of measurement signals with the reference signal which is based on the data sequence assigned to the RFID transponder 140, the processing circuit 120 is then accordingly configured to synchronize the reference signal and the plurality of measurement signals to the time instant $S_0$ of maximum correlation of the reference measurement signal with the calibration signal.

For example, the processing circuit 120 may be configured to correlate the synchronized reference signal with only a single signal portion of the measurement signal for at least one (or all) of the plurality of measurement signals, the signal portion representing only measurement values of the measurement signal from the time instant $S_0$ of maximum correlation of the reference measurement signal with the calibration signal. The degree of correlation determined in this way represents the portion of the RFID transponder 140 in the respective measurement signal of the plurality of measurement signals, i.e. the field portion of the RFID transponder 140 in the magnetic field measured by the respective sensor.

With the approach described above, not only the correct time instant $S_0$ may be determined for the determination of the degrees of correlation, but also the computational effort may be minimized, since the correlation with the reference signal for each measurement signal has to be performed only at one time instant and not at a multitude of time instants (e.g. with different time offsets of the plurality of measurement signals to the reference signal).

The time instant $S_0$ indicates the time instant at which the reference RFID transponder 170 actually begins with the field modulation, it may, however, occur, e.g. due to different implementations of the RFID transponder 140 and the further RFID transponder 150, that these do not begin with the field modulation at the same time instant $S_0$ as the reference RFID transponder 170. For example, the RFID transponder 140 may start field modulation earlier and the further RFID transponder 150 may start later.

If the correlation of the measurement signals with the reference signals for the two RFID transponders 140, 150 is now determined (calculated) for the time instant $S_0$, an error in the correlation result may result due to the inaccurate synchronization. If the deviation remains less than one symbol duration in the reference signals, there are still periods of time during which the data sequences are perfectly orthogonal. However, the portions in which the data sequences are not orthogonal may cause an error in the correlation calculation. The error caused by the shift despite synchronization depends on the ratio of orthogonal to non-orthogonal portion of the data sequences transmitted by the RFID transponders 140, 150, which make up the received signal.

In the following, an approach is therefore described in which the portion of the orthogonal range used for the correlation is increased and/or the portion of the non-orthogonal range used for the correlation is decreased.

The shift of the transmitted data sequences with respect to each other may also be construed as a shift of the plurality of measurement signals of the sensors 110-1, 110-2, 110-3, 110-4 and 110-5 with respect to the reference signal used in the correlation, since this signal is synchronized to the reference transponder.

Figure 2:
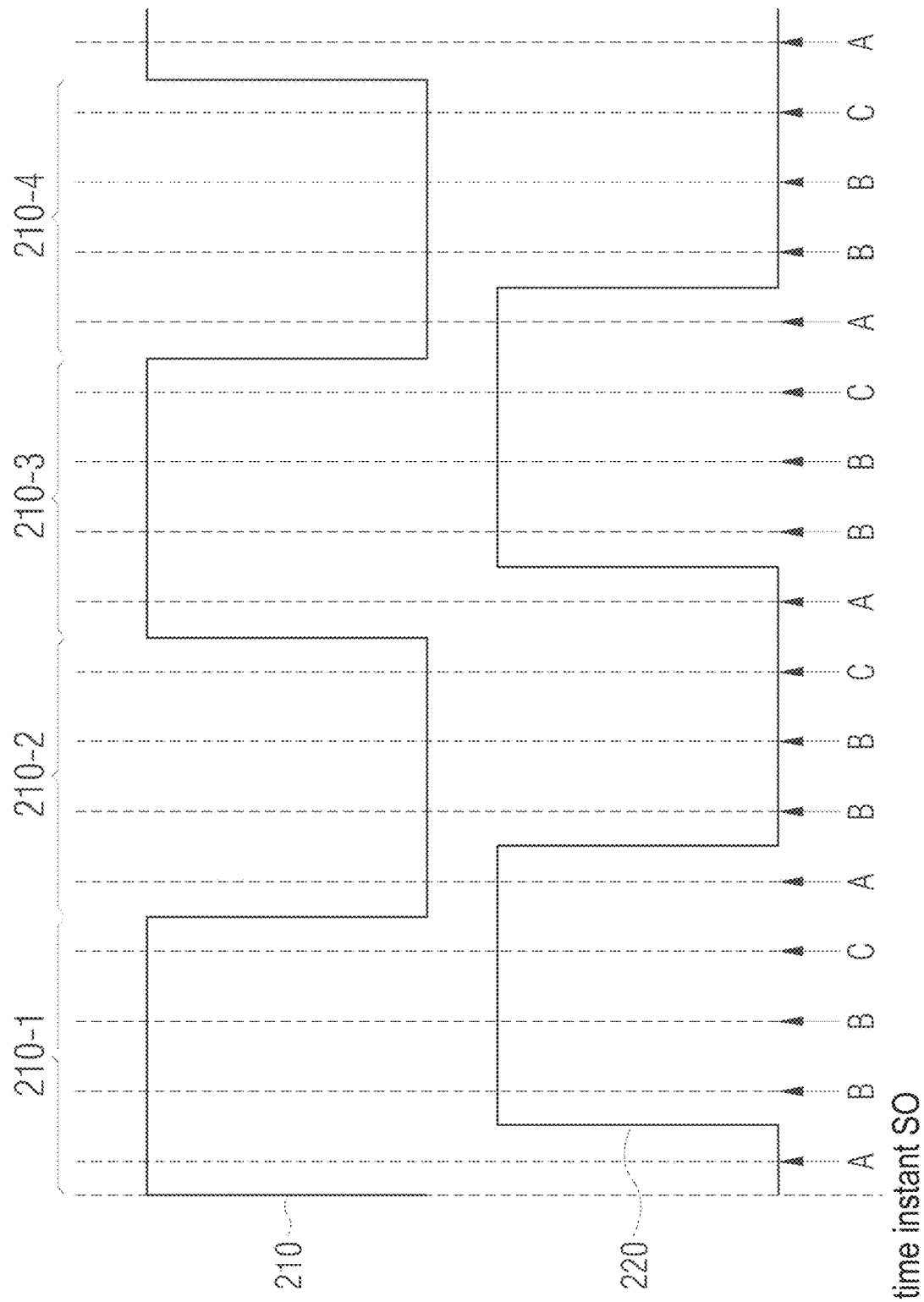
FIG. 2 illustrates an example of a measurement signal and a reference signal.

This is exemplarily illustrated in FIG. 2, which illustrates a reference signal 210 synchronized to the time instant $S_0$ and a signal portion 220 of one of the plurality of measurement signals, which only represents measurement values of the measurement signal from the time instant $S_0$ of maximum correlation of the reference measurement signal with the calibration signal. In the example of FIG. 2 a time-discrete system is assumed, but the proposed approach is not limited to time-discrete systems. As already indicated above, reference signal 210 represents a plurality of symbols. Accordingly, the reference signal comprises a plurality of signal portions 210-1, 210-2, 210-3, 210-4 etc., each representing one of the symbols. A symbol is represented by several samples of the reference signal 210. In the example of FIG. 2, a symbol is each represented by four samples—however, any other number of samples may be used for the representation of a symbol.

With perfect (ideal) synchronization of the start of modulation by the RFID transponders 140, 150, the data sequences for each sample would be orthogonal. If there is now a shift greater than the sample period, there is also a portion of the sample values where the data sequences no longer need to be orthogonal. These samples are at the beginning and/or end of a symbol—depending on whether the transponder 140, 150 to be located starts the field modulation earlier or later than the reference RFID transponder 170. In the example shown in FIG. 2, the transponder 140, 150 to be located starts the field modulation later than the reference RFID transponder 170.

In order to minimize the errors in the correlation result, the processing circuit 120 does not include the sample values in the correlation that are most likely to lie outside the orthogonal range. Since it is generally not known whether the transponder 140, 150 to be located starts the field modulation earlier or later than the reference RFID transponder 170, the sample values both at the beginning and at the end of a symbol for the measurement signal under consideration are most likely to lie outside the orthogonal range. Accordingly, only the sample values in the middle of a symbol, for example, are considered in the correlation.

In the example shown in FIG. 2, the signal portion 220 of the measurement signal is shifted by one sample to the reference signal 210 (i.e. the signal portion 220 of the measurement signal is too late compared to the reference signal 210). Correspondingly, the samples marked A lie outside the orthogonal range and would thus make an erroneous contribution to the correlation. The samples marked B are most likely not affected by a time shift. If the signal portion 220 of the measurement signal would be too early compared to the reference signal 210, the samples marked C would lie outside the orthogonal range and would thus make an erroneous contribution to the correlation. The sample values marked A and C are therefore affected by a time shift with a certain probability. Accordingly, the processing circuit 120 uses only the samples of the reference signal 210 marked B for correlation. If, for example, eight samples were used instead of four, only the two middle, the four middle or the six middle samples could be used for correlation. The number of samples used per symbol may be selected. The more samples per symbol are used, the better noise characteristics may be achieved. Conversely, a greater tolerance for time asynchrony may be achieved, the less samples per symbol are used.

In other words: The processing circuit 120 is configured to correlate the signal portion 220 of the measurement signal only with a respective sub-portion (sub-range) of each of the plurality of signal portions 210-1, 210-2, 210-3, 210-4 of the synchronized reference signal 210 which has a predetermined distance from a beginning and an end of the respective signal portion of the reference signal 210.

In this way, both a positive and a negative time difference of the data sequence transmitted by the RFID transponder to be located to the data sequences transmitted by the other RFID transponders and/or the reference signal used for correlation may be compensated.

This improves the ratio of the orthogonal to non-orthogonal portion used of the measurement signal to the reference signal and thus also the correlation result. In addition, the computational effort may be reduced, since not all samples and/or the signal portions of the reference signal are considered as a whole in the correlation.

For example, samples in the reference signal that are not to be used may be set to 0 so that they have no influence on the correlation. The proposed approach may therefore also be understood as a reduction of the data sequence underlying the reference signal, i.e. as a code reduction.

The above described synchronization of the measurement signals and the reference signals as well as the reduction of the data sequence underlying the reference signal may enable the reliable localization of a larger number of RFID transponders in the propagation range of the magnetic exciter field 131. The synchronization of RFID transponders may allow the use of data sequences that are only orthogonal if they are synchronous. As there are many more data sequences that are only orthogonal when they are synchronous than data sequences that are also orthogonal when they are not synchronized, the proposed approach may thus allow for a broadening of the data sequences usable for RFID transponder localization.

As described in more detail above, the signals measured in the respective antennas may each be correlated in the receiver (RFID reader) with the known data sequences stored in the RFID transponder. If the RFID transponder with its known data sequence is located in the exciter field of a reader, the height of the correlation peak (i.e. the degree of correlation) in the RFID reader may be regarded as an indicator for the measured field strength of the respective antenna. By offsetting the correlation peaks (i.e. the degrees of correlation), the RFID transponder may be located (after a calibration) according to the aforementioned principles. Due to the property of orthogonality of the individual data sequences both before and after encoding, one data sequence has no contribution to the correlation peak (i.e. the degree of correlation) of the other sequences orthogonal to it—and vice versa.

In this way, the field contributions of the individual RFID transponders used for localization may be separated in the receiver. The influence of the individual transponder responses is prevented by the orthogonality of the individual data sequences, so that a simultaneous localization of several RFID transponders is possible. In such a way a complex bidirectional communication between the RFID transponder and a reader may be omitted.

Figure 3:
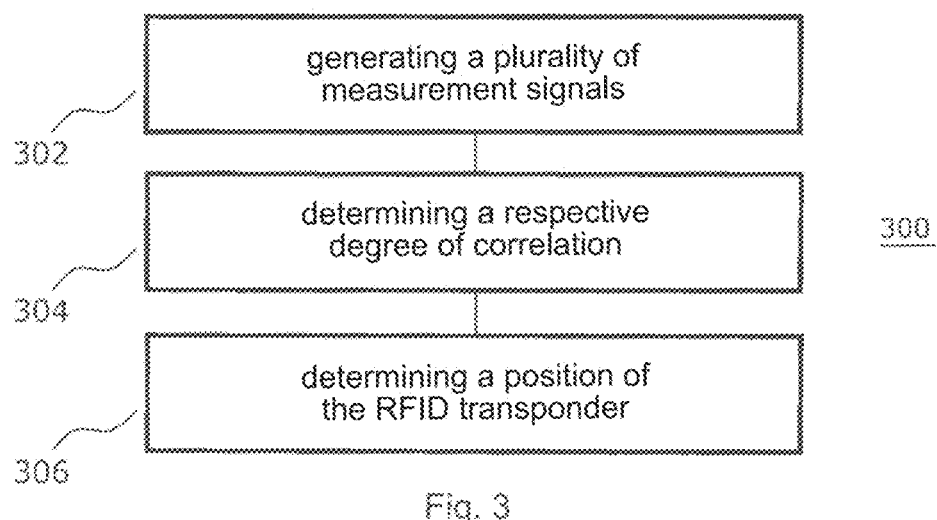
FIG. 3 illustrates a flow chart of an example of a method for locating an RFID transponder.

In order to summarize the aspects described above regarding the localization of RFID transponders again, FIG. 3 illustrates a flow chart of a method 300 for locating an RFID transponder. Method 300 comprises generating 302 a plurality of measurement signals based on a magnetic field measured by a plurality of sensors. The method 300 further comprises determining 304 a respective degree of correlation for each of the plurality of measurement signals with a reference signal. The reference signal is based on a data sequence assigned to the RFID transponder. In addition, the method 300 comprises determining 306 a position of the RFID transponder based on the degrees of correlation of the plurality of measurement signals.

More details and aspects of the method are described above in connection with further embodiments (e.g. FIG. 1). The method may include one or more optional features according to the further embodiments.

Embodiments of the present disclosure thus concern, among other things:

1) Depositing of known, suitable sequences as data for the TTF mode of an RFID transponder, which have orthogonality to each other according to a protocol-specific e.g. Manchester or biphase coding (e.g. Hadamard sequences). A low cross-correlation of the sequences to each other is important.
2) A cyclical switching off of the exciter field to synchronize the transponders in TTF mode. More sequences with orthogonal character may thus to be used.
3) Separation of the signals in the receiver by correlation.
4) Use of the correlation peaks as an indicator for the field strength in the respectively measured antenna for the respective transponder.
5) Localization and estimation of orientation based on the derived field strengths.

The aspects and features described together with one or more of the previously detailed examples and figures may as well be combined with one or more of the other examples in order to replace a like feature of the other example or in order to additionally introduce the feature to the other example.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

It is to be understood that the disclosure of multiple steps, processes, operations or functions disclosed in the specification or claims may not be construed as to be within the specific order, unless explicitly or implicitly stated otherwise, for instance for technical reasons. Therefore, the disclosure of multiple steps or functions will not limit these to a particular order unless such steps or functions are not interchangeable for technical reasons. Furthermore, in some examples a single step, function, process or operation may include or may be broken into multiple sub-steps, -functions, -processes or -operations, respectively. Such sub steps may be included and part of the disclosure of this single step unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to also include features of a claim to any other independent claim even if this claim is not directly made dependent to the independent claim.

The invention claimed is:

1. A method for locating an RFID transponder, comprising:
 generating a plurality of measurement signals based on a magnetic field generated from an RFID transponder and measured by a plurality of sensors simultaneously at a respective position of the sensors;
 determining a respective correlation peak value for each of the plurality of measurement signals with a reference signal by cross-correlating each of the plurality of measurement signals with the reference signal to generate a set of correlation peak values, the reference signal being based on a data sequence assigned to the RFID transponder; and
 determining a position of the RFID transponder based on the set of correlation peak values of the plurality of measurement signals.

2. The method according to claim 1, wherein determining the position of the RFID transponder further comprises:
 comparing the set of correlation peak values of the plurality of measurement signals to multiple sets of reference correlation peak values, wherein a possible position of the RFID transponder is assigned to each of the multiple sets of reference correlation peak values.

3. The method according to claim 2, wherein the reference correlation peak values are each determined by a simulation.

4. The method according to claim 2, wherein further a possible orientation of the RFID transponder is each assigned to the sets of reference correlation peak values.

5. The method according to claim 1, wherein the magnetic field comprises a first field component generated by the RFID transponder and a second field component generated by a further RFID transponder.

6. The method according to claim 5, wherein the first field component generated by the RFID transponder carries first data which are based on the data sequence assigned to the RFID transponder.

7. The method according to claim 6, wherein the second field component carries second data which are based on a further data sequence assigned to the further RFID transponder, the first data being orthogonal to the second data.

8. The method according to claim 1, wherein the data sequence assigned to the RFID transponder is a Hadamard sequence, a Walsh sequence, a gold sequence or a sequence of maximum length.

9. The method according to claim 1, further comprising:
determining a further correlation peak value for each of the plurality of measurement signals with a further reference signal, the further reference signal being based on a further data sequence assigned to a further RFID transponder; and
determining a position of the further RFID transponder based on the further correlation peak values of the plurality of measurement signals.

10. The method according to claim 1, further comprising:
interrupting a formation of a magnetic exciter field by all exciter elements which form the magnetic exciter field; and
resuming the formation of the magnetic exciter field in order to supply RFID transponders receiving the magnetic exciter field with energy simultaneously via the magnetic exciter field.

11. The method according to claim 1, further comprising:
forming a magnetic exciter field using at least one exciter element, wherein a command is modulated onto the magnetic exciter field, which command instructs all RFID transponders receiving the command to form a magnetic field based on data stored in the RFID transponder.

12. The method according to claim 10, further comprising:
generating a reference measurement signal based on a measurement of the magnetic field by a reference sensor; and
determining a time instant of maximum correlation of the reference measurement signal with a calibration signal, wherein the calibration signal is based on a data sequence assigned to a reference RFID transponder, and wherein the magnetic field comprises a field component generated by the reference RFID transponder,
wherein determining the respective correlation peak value for each of the plurality of measurement signals with the reference signal comprises:
synchronizing the reference signal and the plurality of measurement signals to the time instant of maximum correlation of the reference measurement signal with the calibration signal.

13. The method according to claim 12, wherein synchronizing the reference signal and the plurality of measurement signals comprises:
correlating the synchronized reference signal with only a single signal portion of the measurement signal for at least one of the plurality of measurement signals, the signal portion representing only measurement values of the measurement signal from the time instant of maximum correlation of the reference measurement signal with the calibration signal.

14. The method according to claim 13, wherein a length of the signal portion of the measurement signal is identical to a length of the reference signal.

15. The method according to claim 13, wherein the reference signal comprises a plurality of signal portions which each represent a symbol, and wherein correlating the synchronized reference signal with only the signal portion of the measurement signal comprises:
correlating the signal portion of the measurement signal only with a respective sub-portion of each of the plurality of signal portions of the synchronized reference signal which has a predetermined distance from a beginning and an end of the respective signal portion of the reference signal.

16. The method according to claim 12, wherein the reference sensor and the reference RFID transponder are arranged spaced apart from the plurality of sensors such that a signal strength of a signal component which is based on the field component of the magnetic field generated by the reference RFID transponder is greater in the reference measurement signal than a summed signal strength of signal components which are based on field components of the magnetic field generated by other RFID transponders.

17. A device for locating an RFID transponder, comprising:
a plurality of sensors configured to generate a plurality of measurement signals based on a magnetic field generated by an RFID transponder and measured by the plurality of sensors simultaneously at a respective position of the sensors; and
a processing circuit configured to:
determine a respective correlation peak value for each of the plurality of measurement signals with a reference signal by cross-correlating each of the plurality of measurement signals with the reference signal to generate a set of correlation peak values, the reference signal being based on a data sequence assigned to the RFID transponder; and
determine a position of the RFID transponder based on the set of correlation peak values of the plurality of measurement signals.

18. The device according to claim 17, wherein the processing circuit is further configured to:
determine the position of the RFID transponder by comparing the set of correlation peak values of the plurality of measurement signals to multiple sets of reference correlation peak values, wherein a possible position of the RFID transponder is assigned to each of the multiple sets of reference correlation peak values.

19. The device according to claim 17, wherein the magnetic field comprises a first field component generated by the RFID transponder and a second field component generated by a further RFID transponder.

20. The device according to claim 17, further comprising one or more exciter elements, wherein all exciter elements which form a magnetic exciter field are configured to:
interrupt the formation of the magnetic exciter field; and resume the formation of the magnetic exciter field in order to supply RFID transponders receiving the magnetic exciter field with energy simultaneously via the magnetic exciter field.

21. The device according to claim 17, further comprising:
at least one exciter element configured to form a magnetic exciter field, wherein a command is modulated onto the magnetic exciter field, which command instructs all RFID transponders receiving the command to form a magnetic field based on data stored in the RFID transponder.

22. The device according to claim 20, further comprising a reference sensor configured to generate a reference measurement signal based on a measurement of the magnetic field, wherein the processing circuit is further configured to:
determine a time instant of maximum correlation of the reference measurement signal with a calibration signal, wherein the calibration signal is based on a data sequence assigned to a reference RFID transponder, and wherein the magnetic field comprises a field component generated by the reference RFID transponder; and
synchronize the reference signal and the plurality of measurement signals to the time instant of maximum correlation of the reference measurement signal with the calibration signal.

23. The device according to claim 22, wherein the processing circuit for synchronizing the reference signal and the plurality of measurement signals is configured to correlate the synchronized reference signal with only a single signal portion of the measurement signal for at least one of the plurality of measurement signals, the signal portion representing only measurement values of the measurement signal from the time instant of maximum correlation of the reference measurement signal with the calibration signal.

24. The device according to claim 22, wherein the reference signal comprises a plurality of signal portions which each represent a symbol, and wherein the processing circuit is further configured to correlate the signal portion of the measurement signal only with a respective sub-portion of each of the plurality of signal portions of the synchronized reference signal which has a predetermined distance from a beginning and an end of the respective signal portion of the synchronized reference signal.

25. An RFID system, comprising:
a device for locating an RFID transponder according to claim 17;
an RFID transponder, wherein the RFID transponder is configured to generate a first field component of the magnetic field, wherein the first field component carries first data which is based on the data sequence assigned to the RFID transponder; and
a further RFID transponder, wherein the further RFID transponder is configured to generate a second field component of the magnetic field, wherein the second field component carries second data which is based on a further data sequence assigned to the further RFID transponder, the first data being orthogonal to the second data.

* * * * *